(12) United States Patent
Hornung et al.

(10) Patent No.: US 9,146,143 B2
(45) Date of Patent: Sep. 29, 2015

(54) FLOW SENSOR ARRANGEMENT

(75) Inventors: Mark Hornung, Stafa (CH); Felix Mayer, Stafa (CH); Claudia Kuttel, Zurich (CH)

(73) Assignee: Sensirion AG, Stafa (CH)

( * ) Notice: Subject to any disclaimer, the term of this patent is extended or adjusted under 35 U.S.C. 154(b) by 290 days.

(21) Appl. No.: 13/809,516

(22) PCT Filed: Aug. 17, 2010

(86) PCT No.: PCT/CH2010/000201
§ 371 (c)(1),
(2), (4) Date: Mar. 27, 2013

(87) PCT Pub. No.: WO2012/021999
PCT Pub. Date: Feb. 23, 2012

(65) Prior Publication Data
US 2013/0199289 A1 Aug. 8, 2013

(51) Int. Cl.
*G01F 5/00* (2006.01)
*G01F 1/684* (2006.01)
*G01F 15/12* (2006.01)

(52) U.S. Cl.
CPC ............... *G01F 5/00* (2013.01); *G01F 1/6842* (2013.01); *G01F 15/12* (2013.01)

(58) Field of Classification Search
CPC ........ G01F 1/6842; G01F 5/00; G01F 15/185
USPC ................. 73/202.5, 204.21, 204.22, 204.15, 73/861.52, 202
See application file for complete search history.

(56) References Cited

U.S. PATENT DOCUMENTS

| | | | |
|---|---|---|---|
| 6,361,206 B1 * | 3/2002 | Bonne | 73/204.22 |
| 7,059,184 B2 * | 6/2006 | Kanouda et al. | 73/202.5 |
| 7,228,733 B2 * | 6/2007 | Seki et al. | 73/202.5 |
| 2005/0183500 A1 | 8/2005 | Kanouda et al. | |
| 2006/0059985 A1 | 3/2006 | Seki et al. | |

FOREIGN PATENT DOCUMENTS

WO 0045163 9/2000

OTHER PUBLICATIONS

PCT International Search Report PCT/CH2010/000201.

* cited by examiner

*Primary Examiner* — Lisa Caputo
*Assistant Examiner* — Jonathan Dunlap
(74) *Attorney, Agent, or Firm* — Cooper & Dunham LLP

(57) ABSTRACT

There is disclosed a flow sensor arrangement, comprising a main channel (1) for conveying a fluid, a bypass (2) connected to the main channel (1) for conveying a portion of the fluid supplied in the main channel (1), and a flow sensor (6) for measuring a flow of the fluid portion in the bypass (2). The bypass (2) branches off from the main channel (1) at an angle (α) of less than 90 degrees between an inlet section (21) of the bypass (2) and a supply section (11) of the main channel (1). By such design means, particles can be prevented from entering the bypass (2) by this adversely affecting the measurements.

13 Claims, 3 Drawing Sheets

FLOW SENSOR ARRANGEMENT

CROSS-REFERENCE TO RELATED APPLICATIONS

This application is a §371 national stage of PCT International Application No. PCT/CH2010/000201, filed Aug. 17, 2010, the entire contents of each of which are hereby incorporated by reference into this application.

TECHNICAL FIELD

The present disclosure refers to a flow sensor arrangement and in particular to a flow sensor arrangement comprising a bypass.

BACKGROUND ART

Flow sensors may be used for measuring flows of any fluid such as liquids or gases. Such flow sensors may not be arranged directly in a main channel which main channel conveys the bulk of the fluid. Instead, the flow sensor may be arranged in a bypass bypassing the main channel into which bypass a portion of the fluid is diverted from the main channel. As a result, the flow sensor measures the flow of such portion of fluid in the bypass. The flow in the bypass in turn is a measure of the flow in the main channel which flow in the main channel can be derived by suitable conversion factors from the flow in the bypass. The arrangement of the flow sensor in the bypass may be owed to a better accessibility, e.g. for taking readings from the flow sensor, or for repair and/or exchange purposes, or to a better resolution in the measurement.

For the reason that the bypass is designed to only accept a small portion of the overall fluid conveyed in the main channel, the bypass dimensions are small compared to the dimensions of the main channel. Hence, the bypass generally is more susceptible to contamination. Such contamination may include particles contained in the fluid as conveyed in the main channel which may enter the bypass. Such particles may either become stuck in the bypass and, therefore, increase the flow resistance in the bypass or adversely impact the flow sensor itself. Both alternatives lead to incorrect measurement results which do not represent the real flow in the bypass and the main channel respectively.

DISCLOSURE OF THE INVENTION

The problem to be solved by the present invention is therefore to provide a flow sensor arrangement in which particles are hampered from entering a bypass of is the flow sensor arrangement.

This problem is solved by a flow sensor arrangement according to the features of claim 1. In such flow sensor arrangement, a bypass is connected to a main channel for conveying a portion of the fluid supplied via is the main channel. A flow sensor is arranged for measuring a flow in the bypass. The bypass branches off from the main channel at an angle of less than 90 degrees between an inlet section of the bypass and a supply section of the main channel.

Due to such arrangement of the inlet section of the bypass with respect to the main channel a flow into the inlet section includes a component which is directed opposite to the flow direction in the main channel. It was observed that such bypass design helps in preventing particles from entering the bypass. It seems that particles do not tend to reverse their flow direction due to the mass and velocity making these particles inert for a change in flow direction. Even if, as suggested in a preferred embodiment of the present invention, the influx of fluid into the bypass is supported by arranging a flow resistance in the main channel, such particles may be sufficiently inert not to follow into the bypass.

As a result, fewer particles may enter the bypass, such that the flow resistance in the bypass may not be increased by such particles and the flow sensor may not be adversely affected by such particles either. Overall, the measurement results may be improved and may more accurately represent the actual flow in the bypass and the main channel respectively.

Other advantageous embodiments are listed in the dependent claims as well as in the description below.

BRIEF DESCRIPTION OF THE DRAWINGS

The aspects defined above and further aspects, features and advantages of the present invention can also be derived from the examples of embodiments to be described hereinafter. Such description makes reference to the annexed drawings, wherein.

MODES FOR CARRYING OUT THE INVENTION

Figure 1:
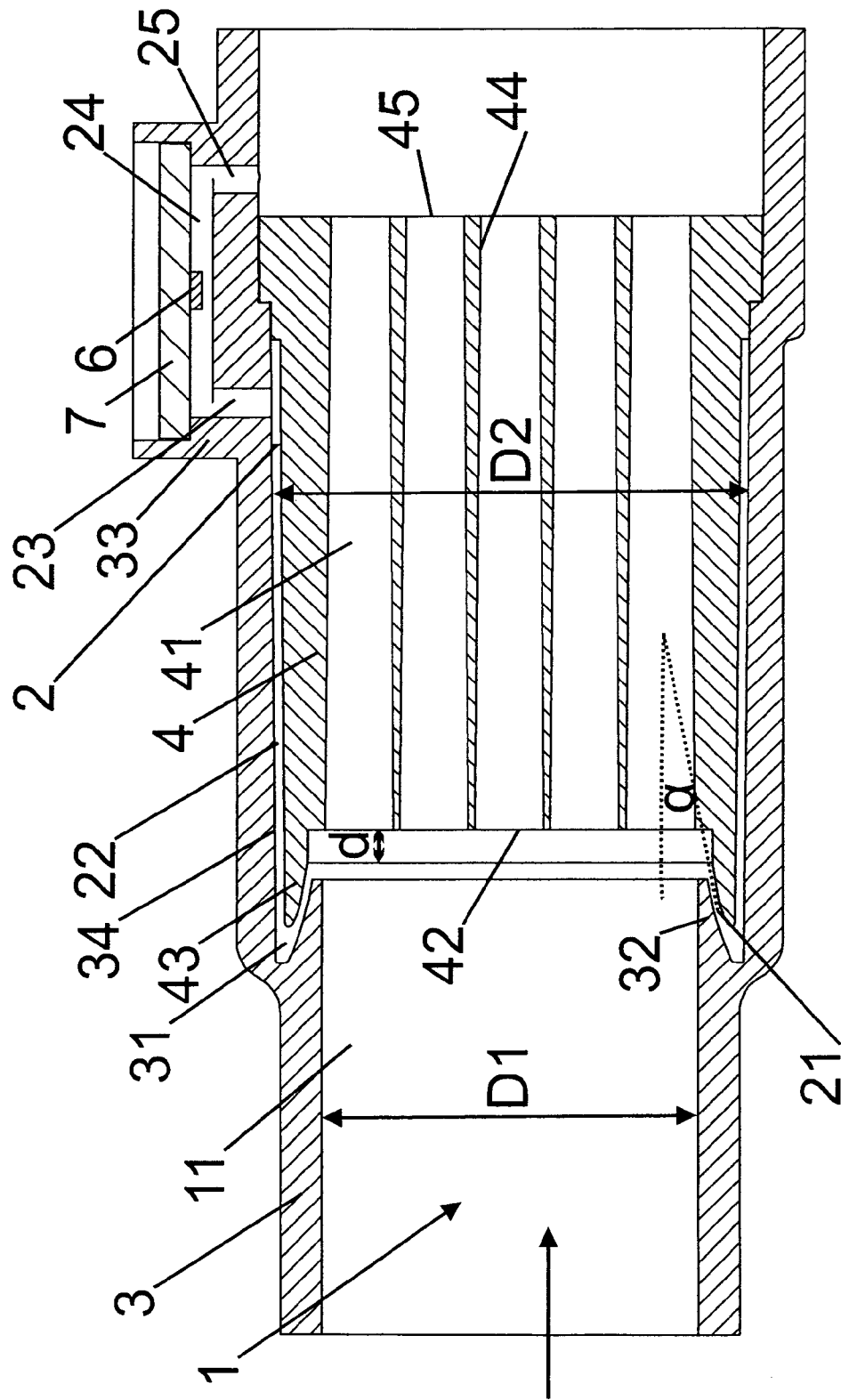
FIG. 1 illustrates a longitudinal cut of a flow sensor arrangement according to an embodiment of the present invention.

Similar or relating components in the several figures are provided with the same reference numerals.

Figure 2:
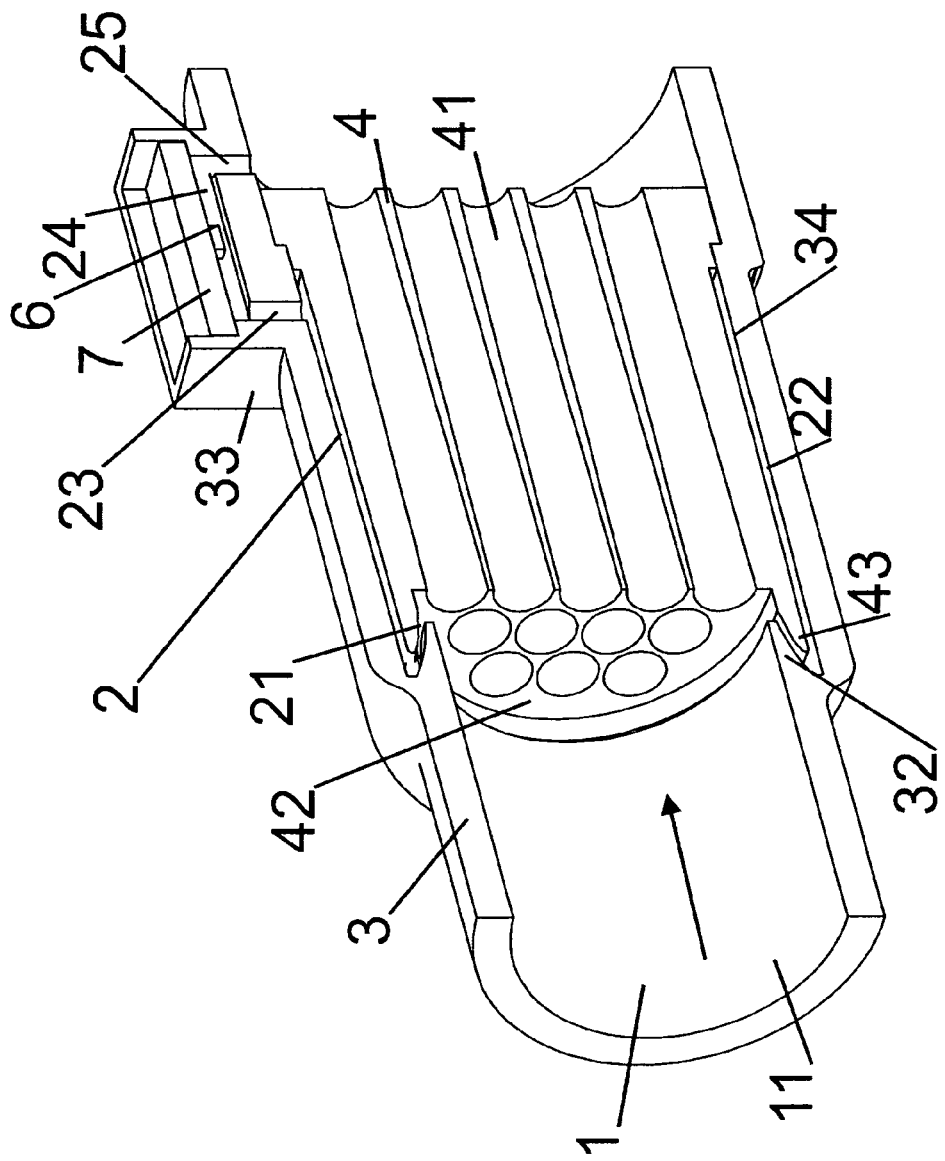
FIG. 2 illustrates a perspective view of the flow sensor arrangement of FIG. 1 which flow sensor arrangement is longitudinally cut for illustration purposes.

FIG. 1 illustrates a longitudinal cut of a flow sensor arrangement according to an embodiment of the present invention, and FIG. 2 illustrates a perspective view of such flow sensor arrangement which flow sensor arrangement is longitudinally cut in FIG. 2 for illustration purposes.

A housing 3 defines a main channel 1 for conveying a fluid. The term "fluid" includes all media capable of flowing along a channel such as gases, liquids, etc. In the present embodiment, the housing 3 basically is of cylindrical shape with a longitudinal aperture of cylindrical shape serving as main channel 1. The fluid to be conveyed in the main channel 1 may flow in a flow direction indicated by an arrow in FIG. 1. The housing 3 may be integral part of a longer tube, or the housing 3 may contribute to a flow sensor arrangement separate from any supply and delivery pipe which pipes may be connected to the housing 3 at both of its ends. It is noted that the housing 3 preferably defines a cylindrical main channel 1, however, a profile of the main channel 1 other than a circle, such as a rectangle, for example, may be implemented subject to the application. The housing 3 advantageously is manufactured as injection moulded component.

Within the housing 3, i.e. in the main channel 1, there is arranged a flow resistance 4. The flow resistance 4 builds a resistance for the fluid in the main channel 1 striking a frond end 42 of the flow resistance 4. In the present embodiment, the flow resistance 4, which preferably is manufactured by injection moulding, includes multiple pipes 41 for the fluid to pass. Permanent structures 44 in between the pipes 41 form a resistance for the fluid. The flow resistance 4 is a component in bypass flow sensor arrangements which allows for a sufficient and well-defined branching of the fluid into the bypass 2. Other designs of the flow resistance 4 may be possible both in terms of profile and arrangement. The design of the flow resistance 4 may preferably be guided by its function to generate a pressure drop of sufficient magnitude to allow a defined branching of the fluid into the bypass, and to allow a sufficient flow of fluid to pass the main channel 1 during operation.

The housing 3 comprises a bypass member 33 in form of an extension of basically rectangular shape, which preferably is integrally manufactured—and in particular is injection moulded—with the rest of the housing 3. The bypass member 33 is designed for holding a carrier 7 with a flow sensor 6 arranged on the carrier 7. The bypass member 33 supports a second section of the bypass 2 which is connected to a first section of the bypass 2 being formed between the flow resistance 4 and the housing 3.

The first section of the bypass 2 includes an inlet section 21 connected to the main channel 1, and a first subsection 22 connected to the inlet section 21 at its one end and to the second section of the bypass 2 in is the bypass member 33 at its other end. For implementing the first section of the bypass 2, the flow resistance 4 includes a lip 43 emerging from the front end 42 of the flow resistance 4 at its periphery. In this embodiment, the lip 43 preferably is formed as integral part of the flow resistance 4 and therefore preferably is manufactured by injection moulding together with the permanent structures 44 of the flow resistor 4.

A diameter of a supply section 11 of the main channel 1 is denoted as D1 in FIG. 1. The supply section of the main channel 1 is defined as section followed by a junction where the bypass 2 branches off. However, at a longitudinal position where the flow resistance 4 is expected to reside within the housing 3 the aperture in the housing 3 shows a different diameter D2 which diameter D2 exceeds diameter D1. In other words, the housing 3 comprises a recessed portion 34 at its inner perimeter. The flow resistance 4 provides for a diameter slightly smaller than D2 such that when the flow resistance 4 is inserted into the main channel 1 a small gap is formed between the recessed portion 34 of the housing 3 and the flow resistance 4 which gap forms the first subsection 22 of the bypass 2. The flow resistance 4 may be fixed to the housing 1, e.g. by gluing, at its perimeter in vicinity of its lower front end 45.

In a region where the inner diameter of the housing 3 changes from D1 to D2, a groove 31 is formed in the inner wall of the housing 3 which groove 31 forms the transition from D1 to D2. A nose 32 of the housing 3 terminates the groove 31 at least partially towards the main channel 1. In this region, the lip 43 extending from the flow resistance 4 is reaching into the groove 31 such so that an inner wall of the lip 43 on the one hand and the nose 32 on the other hand define the inlet section 21 of the bypass 2. The inlet section 21, thus, is connected to the main channel 1 at its one end, and to the first subsection 22 of the bypass 2 at its other end.

As can derived from FIG. 1, the inlet section 21 of the bypass 2 branches off from the supply section 11 of the main channel 1 at an angle α of less than 90 degrees. The definition of such angle α can be derived from FIG. 1 in which the angle α represents the acute angle between the main channel 1 and the bypass 2, and in particular the supply section 11 of the main channel 1 supplying fluid to the junction where the bypass 2 branches off the main channel 1, and the inlet section 21 of the bypass 2. Preferably, the inlet section 21 shows a longitudinal extension of at least 3 mm, preferably between 2 and 7 mm, and a diameter of not less than 0.2 mm, preferably between 0.3 mm and 0.7 mm.

An orientation of the supply section 11 typically coincides with the direction of the flow in such supply section 11. The same is true for the inlet section 21 of the bypass 2 which is why such channel arrangement generates a flow in the inlet section 21 which flow has a component that is reverse directed to the flow direction in the main channel 1.

The smaller the angle α is, the larger the reverse component in the inlet section 21 is. However, the smaller the angle α is the smaller the flow in the bypass becomes. On the other hand the smaller the angle α is the more particles are filtered and hampered from entering the bypass 2. The design of the angle α may follow considerations which on the one hand allow for a sufficient flow of fluid in the bypass which may also depend on the fluid itself, the geometry of the flow resistance in the main channel 1 and the magnitude of the flow in the main channel 1, and on the other hand allow for a sufficient particle filtering.

In a preferred embodiment, the angle α is less than 60 degrees. In another preferred embodiment, the angle α is less than 30 degrees.

Advantageously, the inlet section 21 of the bypass 2 does not meet the front end 42 of the flow resistance 4. Instead, the inlet section 21 is arranged at a distance d not less than 3 mm from the front end 42 of the flow resistance 4. A preferred range for such distance d is between 3 to 7 mm. Typically, such distance d is defined as distance between the front end 42 of the flow resistance 4 and the end of the inlet section 21 as shown in FIG. 1

As introduced above, the bypass 2 comprises a first section which first section in the present example includes the inlet section 21 and the first subsection 22. The bottom of the groove 31 in this sense marks the turning point for the fluid being diverted from the inlet section 21 into the first subsection 22 by an angle of more than 90 degrees (and less than 180 degrees, subject to the angle α) for the reason that the first subsection 22 is aligned in parallel to the main channel 1. In the present example, the first section of the bypass 2 is characterized in that it surrounds the main channel 1 as can be derived from FIG. 1: Both the lip 43 and the nose 32 are arranged circumferentially around the main channel 1, and so is the inlet section 21 and the first subsection 22. A circumferential first section of the bypass 2 limits turbulences in the fluid and limits the flow velocity in the bypass 2.

In contrast, a second section of the bypass 2 which includes a second and a third subsection 23 and 24 and an outlet section 25, is arranged in the bypass member 33 and does not surround the main channel 1. The second section is designed in form of relatively short and thin ducts. In the present example, the second subsection 23 is arranged orthogonal to the main channel 1 and is a non-circumferential section. It is connected to the circumferential first subsection 22 of the bypass 2. The third subsection 24 of the bypass 2 is arranged in parallel to the main channel 1 and also is a non-circumferential section. It is further characterized as is section where the flow is measured by means of the flow sensor 6. Preferably, the flow sensor 6 is a thermoelectric sensor measuring temperatures upstream and downstream of a heating element from which temperatures the flow can be derived. The third subsection 24 is connected to an outlet section 25 which is arranged orthogonal to the main channel 1 and is connected to the main channel 1 subsequent to the flow resistance 4.

In the present flow sensor arrangement, the bypass 2 is arranged for bypassing a section of the main channel 1. The bypass 2 accepts a portion of the fluid supplied in the main channel 1 and leads such portion back into the main channel 1. The bypassed section in the main channel 1 typically includes the flow resistance 4.

In another embodiment of the present invention, the first section of the bypass 2 may not surround the main channel 1.

The flow resistance 4 may be attached to the housing 3 all along its longitudinal extension except for, e.g. an upper surface of the flow resistance 4 which may be flattened for allowing a non-circumferential duct to be generated. Still, the flow resistance 4 may comprise the lip 43 at its front end 42 as a longitudinal extension of the—radially—flattened area. In an analogous way, the nose 32 of the housing 3 may not be embodied as circumferential nose 32 but may only be formed opposite to the lip 43. By such means, the inlet section 21 and the first subsection 22 are formed as a duct leading towards the other sections of the bypass 2. In such configuration, the housing 3 may not even have a recessed portion 34. Instead, the flattened upper end of the flow resistance 4 may provide for sufficient space for the respective first subsection 22. In such event, the nose 32 of the housing 3 may to a little extent reach radially into the main channel 1.

Figure 3:
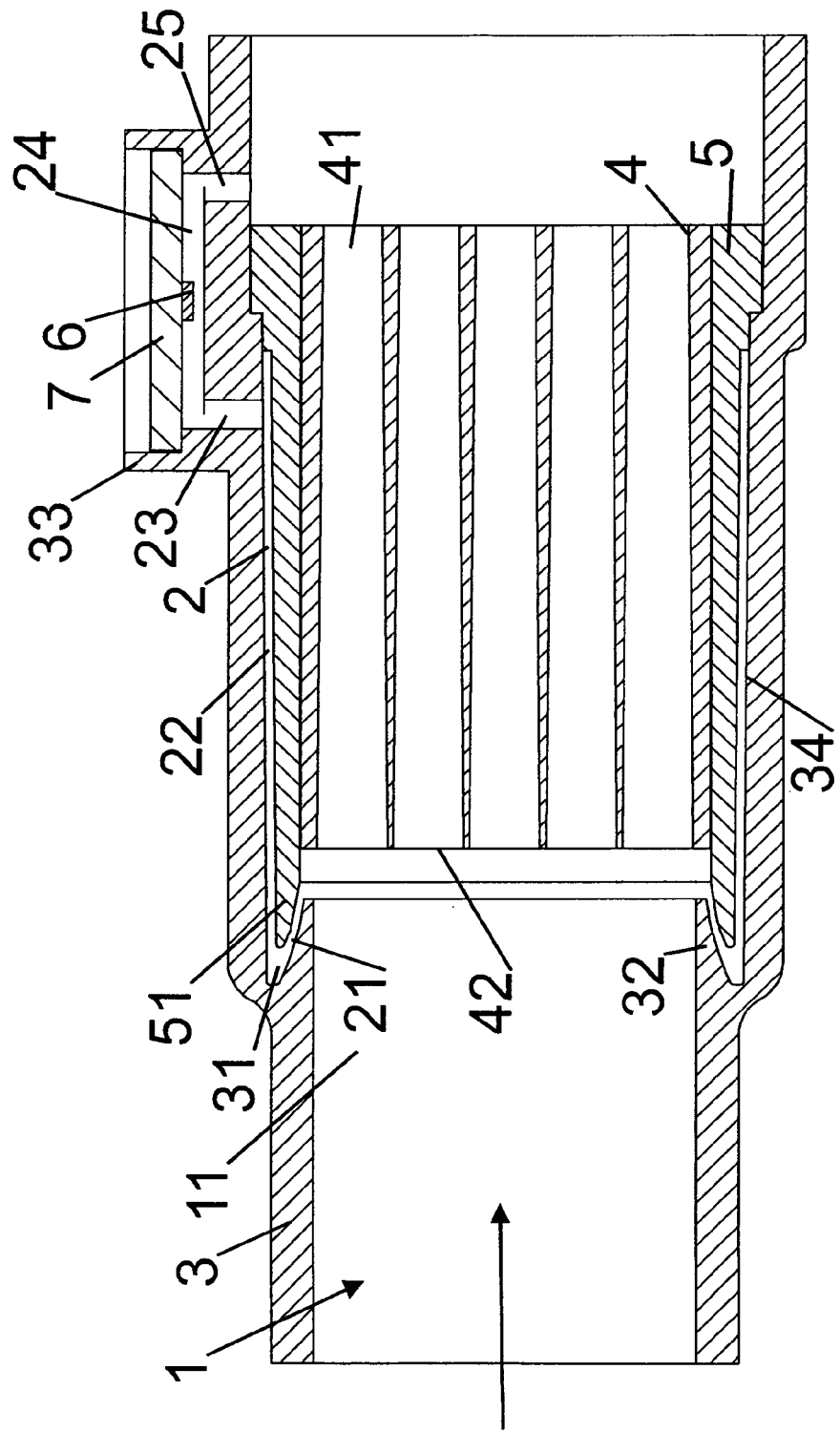
FIG. 3 illustrates a longitudinal cut of a flow sensor arrangement according to another embodiment of the present invention.

FIG. 3 illustrates a longitudinal cut of a flow sensor arrangement according to another embodiment of the present invention. For a better illustration, many reference numerals are omitted which can be derived from FIG. 1. The present embodiment differs from the embodiment of FIG. 1 in that the lip reaching into the groove 31 of the housing 3 no longer forms an integral part of the flow resistance 4 but forms part of a separate element which element is denoted as a spacer 5. An end section of spacer 5 forms the lip 51 reaching into the groove 31. Spacer 5 may take the form of a shell around the flow resistance 4, and may preferably be attached to the flow resistance 4, e.g. by a suitable glue, prior to an insertion of the combined spacer/flow resistance 5, 4 into the main channel 1. In this embodiment, the spacer 5 may be attached to the housing 3 by suitable fixing means, such as a glue.

The spacer 5 may fully or partially be embodied as a laminar flow element including associated surface structures, such as a honeycomb structure for example. In such embodiment, spacer 5 supports a laminar flow of the fluid portion in the bypass 2. Spacer 5 may also be built from multiple layers.

The present flow sensor arrangement may especially be suited for measuring the flow of domestic gas.

The invention claimed is:

1. Flow sensor arrangement, comprising
   a main channel (1) for conveying a fluid,
   a bypass (2) connected to the main channel (1) for conveying a portion of the fluid supplied in the main channel,
   a flow sensor (6) for measuring a flow of the fluid portion in the bypass (2),
   wherein the bypass (2) branches off from the main channel (1) at an angle (α) of less than 30 degrees between an inlet section (21) of the bypass (2) and a supply section (11) of the main channel (1).

2. Flow sensor arrangement according to claim 1, wherein a flow resistance (4) is arranged in the main channel (1) ahead of the inlet section (21) of the bypass (2) in flow direction.

3. Flow sensor arrangement according to claim 2, wherein the inlet section (21) is arranged at a distance (d) not less than 3 mm from the flow resistance (4).

4. Flow sensor arrangement according to claim 2, comprising
   a housing (3) in which the main channel (1) is arranged,
   a groove (31) in an inner wall of the housing (3),
   a nose (32) terminating at least part of the groove towards the main channel (1), and
   a lip (43, 51) reaching into the groove (31) such that the inlet section (21) of the bypass (2) is formed between the lip (43, 51) and the nose (32).

5. Flow sensor arrangement according to claim 4, wherein the lip (43) extends from and is formed as integral part of the flow resistance (4).

6. Flow sensor arrangement according to claim 4, wherein the lip (51) forms the top end of a spacer (5) arranged between the flow resistance (4) and the housing (3).

7. Flow sensor arrangement according to claim 6, wherein the spacer (5) includes a laminar flow element.

8. Flow sensor arrangement according to claim 6, wherein the bypass (2) comprises a first subsection (22) connected to the inlet section (21) which first subsection (22) is aligned in parallel to the main channel (1).

9. Flow sensor arrangement according to claim 8, wherein the first subsection (22) is formed between a recessed portion (34) of an inner wall of the housing (3) and the flow resistance (4) or the spacer (5) respectively.

10. Flow sensor arrangement according to claim 8, wherein the bypass (2) comprises a first section surrounding the main channel (1).

11. Flow sensor arrangement according to claim 10, wherein the first section includes the inlet section (21) and the first subsection (22).

12. Flow sensor arrangement according to claim 11, wherein the bypass (2) comprises a second section connected to the first subsection (22) and the main channel (1) which second section lacks the quality of surrounding the main channel (1), and wherein the flow sensor (6) for measuring the flow is arranged in the second section.

13. Flow sensor arrangement according to claim 4, wherein both the lip (43, 51) and the nose (32) are arranged circumferentially.

* * * * *